United States Patent
Erdel

Patent Number: 5,813,804
Date of Patent: Sep. 29, 1998

[54] BORING TOOL FOR COMPOSITE LAMINATE MATERIALS

[75] Inventor: Bert P. Erdel, Belle Mead, N.J.

[73] Assignee: Mapal, Piscataway, N.J.

[21] Appl. No.: 550,015

[22] Filed: Oct. 30, 1995

[51] Int. Cl.$^6$ ..................................................... B23B 51/02
[52] U.S. Cl. ........................................... 408/145; 408/229
[58] Field of Search .................................. 408/145, 227, 408/229, 230

[56] References Cited

U.S. PATENT DOCUMENTS

| | | | |
|---|---|---|---|
| 4,561,813 | 12/1985 | Schneider | 408/230 |
| 4,759,667 | 7/1988 | Brown | 408/230 |

FOREIGN PATENT DOCUMENTS

| | | | |
|---|---|---|---|
| 662278 | 5/1979 | Russian Federation | 408/230 |

*Primary Examiner*—Daniel W. Howell
*Attorney, Agent, or Firm*—Brian K. Dinicola

[57] ABSTRACT

A polycrystalline diamond (PCD) tipped tool for producing holes in non-ferrous and non-metallic composite materials without delamination. The tool comprises an elongated body portion having a distal cutting region and a proximal shank region and first and second cutting regions including first and second planar surfaces, respectively. The planar surfaces diverge in a direction from the distal cutting region toward the proximal shank region to define a cutting angle that is preferably about 120°.

A first axial flute separates a forward edge of the first cutting region from a trailing edge of the second cutting region and a second axial flute radially opposed to the first axial flute separates a forward edge of the second cutting region from a trailing edge of the first cutting region. Each of the first and second cutting regions further includes a planar surface forming with a forward edge thereof respective first and second clearance angles of between 10° to 20°, with the first clearance angle being greater than said second clearance angle. In accordance with an especially preferred embodiment, the first clearance angle is 19° and the second clearance angle is 11°.

7 Claims, 1 Drawing Sheet

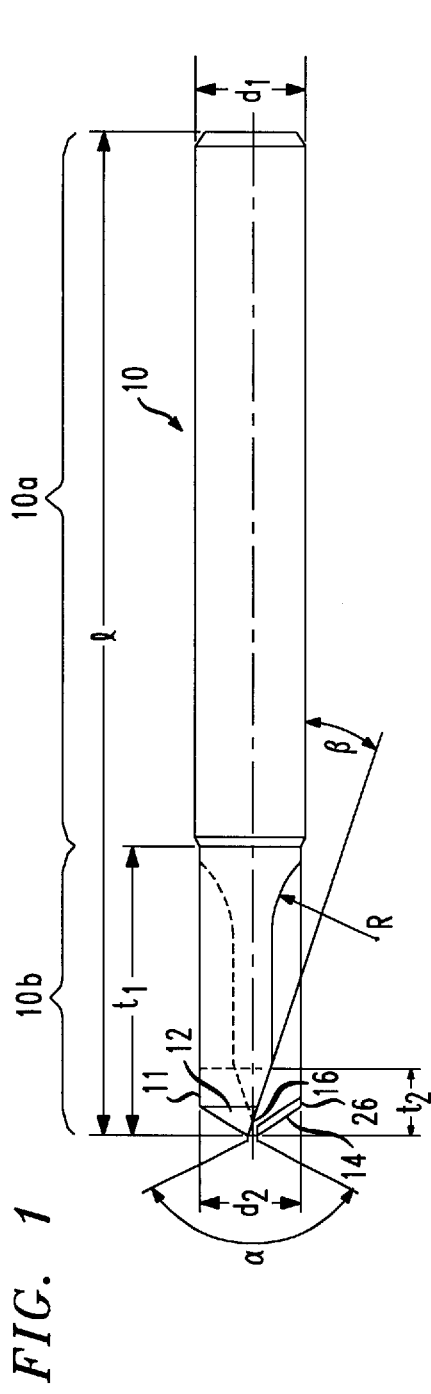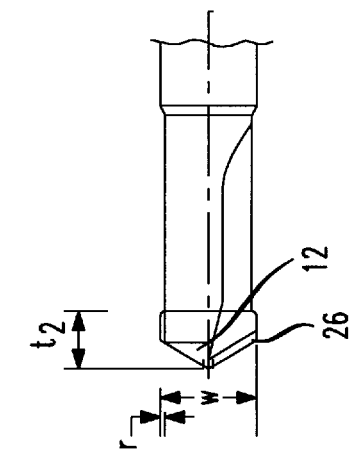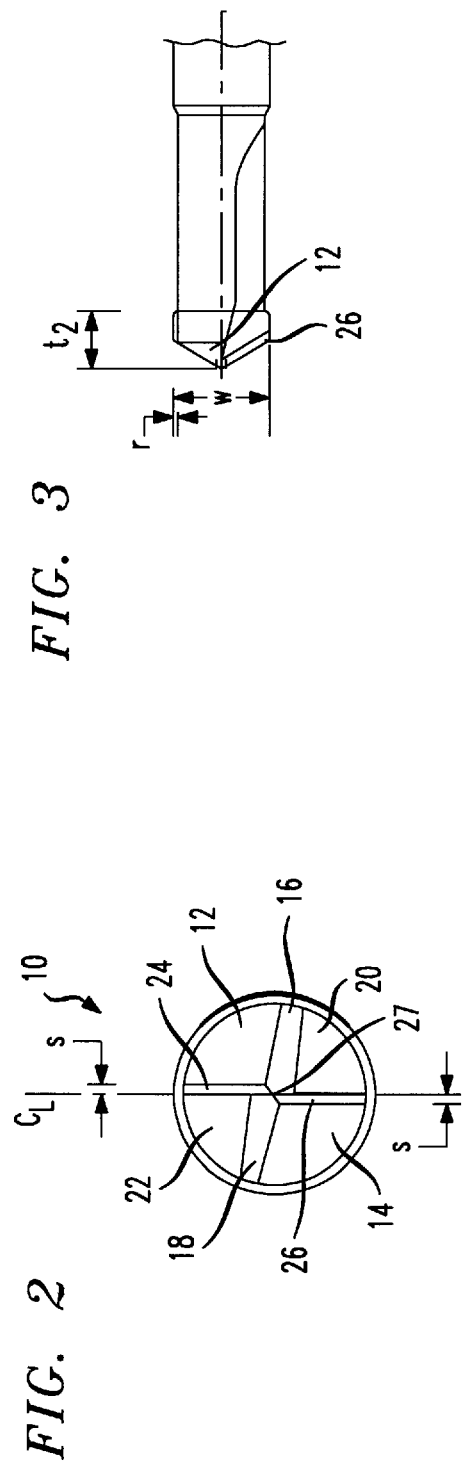

BORING TOOL FOR COMPOSITE LAMINATE MATERIALS

FIELD OF THE INVENTION

The present invention relates to boring tools for drilling holes in composite laminate and, more particularly, to a diamond grit coated boring tool and a process for using the same.

BACKGROUND OF THE INVENTION

Fiber reinforced composite materials are rapidly replacing ferrous metals in many areas including, for example, automotive and aerospace applications. Glass fiber filled composites, for example, are being promoted for control surfaces of aircraft, exterior surfaces for automobiles and even in leaf springs. While these new materials are enabling designers to enjoy vastly improved material properties, they are creating new and difficult problems for the engineers and production line workers who have to form these materials into the desired shapes. Among these problems, delamination is a particular cause for concern because it substantially weakens the structure through which the hole extends. Conventional tool configurations tend to produce excess heat because of the abrasive qualities of the composites. As a result, conventional boring tools typically have a very short tool life and extremely low speeds and feed rates.

SUMMARY OF THE INVENTION

It is therefore an object of the present invention to provide a polycrystal diamond fluted tool, whereby the above described problems can be solved.

It is another object of the present invention to provide an improved revolving tool of polycrystal diamond, which is capable of producing close tolerance holes in non-ferrous and non-metallic composite materials without delamination.

The aforementioned object, as well as others which will become apparent to those skilled in the art, are achieved by a polycrystalline diamond (PCD) tipped tool. The tool comprises an elongated body portion having a distal cutting region and a proximal shank region and first and second cutting regions including first and second planar surfaces, respectively. The planar surfaces diverge in a direction from the distal cutting region toward the proximal shank region to define a cutting angle that is preferably about 120°.

A first axial flute separates a forward edge of the first cutting region from a trailing edge of the second cutting region and a second axial flute radially opposed to the first axial flute separates a forward edge of the second cutting region from a trailing edge of the first cutting region. Each of the first and second cutting regions further includes a planar surface forming with a forward edge thereof respective first and second clearance angles of between 10° to 20°, with the first clearance angle being greater than said second clearance angle. In accordance with an especially preferred embodiment, the first clearance angle is 19° and the second clearance angle is 11°.

Other features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

The present invention will be described with reference to the accompanying drawings, wherein like reference numerals identify like elements, and wherein:

FIG. 1 is a side elevation view of an illustrative embodiment of a polycrystal diamond fluted tool constructed in accordance with the present invention;

FIG. 2 is an enlarged forward elevation view depicting the tip geometry of the polycrystal diamond fluted tool of FIG. 1; and FIG. 3 is a partial side elevation view depicting in detail the body of the polycrystal diamond fluted tool of FIG. 1.

DETAILED DESCRIPTION OF THE PRESENTLY PREFERRED EMBODIMENTS

With initial reference to FIG. 1, there is illustrated a boring tool 10 constructed in accordance with an illustrative embodiment of the present invention. As seen in FIG. 1, tool 10 includes a shank portion 10a and a body portion 10b that includes tip region 11. It should be understood that although shank portion 10a is depicted in FIGS. 1–3 as having a cylindrical configuration, it is contemplated that the selection of a particular shank configuration will largely depend upon the particular machine with which the tool will be used. As such, shank portion 10a can employ any conventional shank configuration needed for compatibility with the intended machine or machines. Moreover, one or more diminutive ducts (not shown) may be defined to accommodate a suitable cooling medium.

In any event, and with continued reference to FIG. 1, it will be seen that tool 10 has an overall length l and a diameter $d_1$, while body portion 10b and tip region 11 have lengths $t_1$ and $t_2$ respectively and a diameter $d_2$. In the illustrative polycrystal diamond tool 10 of FIG. 1, a length l of 90 mm, a length $t_1$ of 26.5 mm, and a length $t_2$ of 6 mm were employed. The dimensions of $d_1$ and $d_2$ were 9.53 mm and 9.50 mm, respectively.

With simultaneous reference now to FIGS. 1 and 2, it can be seen that tip region 11 is formed with opposite essentially or substantially flat surfaces 12, 14 which taper toward the point 27 at an included angle α of between 110° and 125°, with an angle α of 120° being especially preferred. The rearward margins or flat faces 16 and 18 at the ends of flat surfaces 12 and 14, respectively, are ground to a distance of $t_2$, illustratively 6 mm, from tip 24 to define an angle β of 13° to 17°, with an angle β of 15° being especially preferred. Opposed flutes 20 and 22 are provided for chip clearance and lubrication. In the illustrative tool 10 of FIG. 2, each flute includes an arcuate portion with a radius of curvature R of between 10 and 15 mm, with a curvature radius of 12.5 being especially preferred.

The cutting surfaces of tool 10 are defined by flat surfaces 24 and 26, which are ground in to provide clearance angles of 11° and 19°, respectively. As best seen in FIG. 2, each cutting edge begins at a distance s from the center line $C_1$ of the tool. In the illustrative example, each cutting edge extend a distance of 0.30 mm from the center line, so that the planes defined by the respective cutting surfaces 24 and 26 are separated by a total distance of 0.60 mm.

It is contemplated that the boring tool of the present invention may be utilized to bore holes in a variety of composite laminate structures such, for example, as carbon-epoxy-fiberglass structures. Utilizing a tip geometry as described above, clean holes may be made in such structures, without delamination of the surrounding material, at feed rates between 0.00075" to 0.00095" per revolution and a speed range of 1600 to 1900 rpm.

EXAMPLE

A boring tool constructed in accordance with the present invention was provided with two flat faces 12 and 14 which formed a cutting geometry of 120° with two ground in cutting surfaces having clearance angles of 11° and 19°, respectively. A tip region diameter of 9.53 mm was utilized. The tip region was coated with polycrystalline diamond.

The tool was used to bore seven holes in a laminate comprising a 43.7/43.2 mm fiberglass core sandwiched between two layers of composite carbon and epoxy material, the laminate having a total thickness of 71.50/71.25 mm. At a speed of 1750 rpm and a feed rate of 1.5 inches per minute, the seven holes were bored without delaminating the material.

While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A boring tool for producing holes in a composite of at least a first material and a second material having a higher modulus of elasticity than the first material when the tool, relative to the composite, is rotated about its longitudinal axis in a first direction of rotation and is moved in a forward axial direction against the composite, the tool comprising:

an elongated body portion having a distal cutting region and a proximal shank region;

first and second cutting regions including first and second planar surfaces, respectively, said planar surfaces diverging in a direction from the distal cutting region toward the proximal shank region to define a cutting angle of between 110° to 125°;

a first axial flute separating a forward edge of said first cutting region from a trailing edge of said second cutting region; and a second axial flute radially opposed to said first axial flute and separating a forward edge of said second cutting region from a trailing edge of said first cutting region;

wherein each of said first and second cutting regions further includes a planar surface forming with a forward edge thereof respective first and second clearance angles of between 10° to 20°, said first clearance angle being greater than said second clearance angle.

2. The boring tool of claim 1, wherein said distal cutting region comprises a polycrystal diamond surface.

3. The boring tool of claim 1, wherein said first clearance angle is between 17° to 20°.

4. The boring tool of claim 3, wherein said first clearance angle is 19°.

5. The boring tool of claim 3, wherein said second clearance angle is between 10° to 14°.

6. The boring tool of claim 5, wherein said second clearance angle is 11°.

7. The boring tool of claim 1, wherein said cutting angle is 120°.

* * * * *